United States Patent Office 2,917,511
Patented Dec. 15, 1959

2,917,511
BICYCLIC-NITROGEN-HETEROCYCLIC COMPOUNDS

John B. Bicking, Lansdale, Pa., assignor to Merck & Co., Inc., Rahway, N.J., a corporation of New Jersey No Drawing. Application January 30, 1958
Serial No. 712,071

14 Claims. (Cl. 260—240)

The present invention is directed to novel 3-substituted pyrido (2.1-c)-s-triazoles and to a method for preparing the same.

I have discovered that 3-substituted pyrido (2.1-c)-s-triazoles can be readily prepared by reacting together 2-hydrazinopyridine and a carboxylic acid under conditions such that water is evolved and a fused triazole system is formed. In particular, I have found that the 2-hydrazinopyridine can be reacted with a carboxylic acid of the general formula:

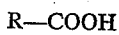

R—COOH wherein R contains from one through nine carbon atoms and can comprise a radical selected from the group consisting of alkyl, cycloalkyl, aryl (by which is meant to include radicals comprising substituted and unsubstituted aryl nuclei), and heterocyclic radicals. Thus, a wide variety of acids can be reacted with 2-hydrazinopyridine in accordance with the process of the present invention, as for example: fatty acids such as acetic, propionic, butyric, isobutyric, valeric, caproic, enanthylic, caprylic, pelargonic, or capric acids; alicyclic acids such as cyclopropane-, cyclobutane-, cyclopentane-, cyclohexane-, or cycloheptane-carboxylic acids; aromatic acids such as benzoic, phenylacetic, toluic, Beta-phenylpropionic, or ethylbenzoic acids; and heterocyclic compounds such as 2-furoic, picolinic, nicotinic, isonicotinic, or thiazole-carboxylic acids. Derivatives of the aforesaid acids can also be utilized, such as acid derivatives containing substituent groups, as for example acids having non-carboxylic-containing substituent groups such as acylamino, methoxy, ethoxy, or other groups.

The 3-substituted pyrido (2.1-c)-s-triazoles of the present invention can be derived from the aforesaid process and comprise compounds having the following formula:

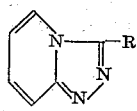

wherein R can be a radical selected from the group consisting of alkyl, cycloalkyl, aryl, and heterocyclic radicals each group having from one to nine carbon atoms. Examples of such radicals include alkyl radicals such as methyl, ethyl, propyl, isopropyl, butyl, isobutyl, amyl, isoamyl, hexyl, heptyl, octyl, and nonyl radicals; cycloalkyl radicals such as cyclopropanyl, cyclobutanyl, cyclopentanyl, cyclohexanyl, cycloheptanyl, cyclooctanyl, and cyclononanyl radicals; aryl radicals such as phenyl, tolyl, xylyl, and trimethoxyphenyl radicals; and heterocyclic radicals such as furyl, pyridyl, and thiazolyl radicals. The above listed radicals are presented merely by way of example, and it is to be understood that other compounds of my invention as defined by the formula set forth above are to be deemed as here-included.

The term "alkyl" used above is to be deemed as comprehending aralkyl radicals, that is radicals in which an aryl group is substituted for a hydrogen atom of an alkyl group, such as styryl, benzyl, benzylidene, cinnamyl, cuminyl, and cuminylidene radicals, and the process of the present invention comprehends the use of aralkyl carboxylic acids comprising such radicals.

The compounds of the present invention are useful anticonvulsants, and may be used to combat convulsions induced in animals due to strychnine poisoning. Ancillary to their use as anticonvulsants, the compounds of the present invention exhibit a tranquilizing action on animals.

In order to illustrate the present invention, specific examples of the preparation of a number of compounds within the larger group of compounds encompassed by the present invention is set forth below:

Example 1

3-methylpyrido (2.1-c)-s-triazole is prepared as follows:

2-hydrazinopyridine (13.5 g., 0.124 mole) and acetic acid (13.2 g., 0.22 mole) are placed in a Claisen distilling flask and heated from 140° to 180° C. during a period of forty minutes. Water is evolved vigorously. The residual oil then is distilled at oil pump vacuum. There is obtained 12.0 g. of a colorless oil B.P. 165–170° C. at 0.7 mm. Hg pressure which crystallizes in the receiver and has a melting point of 112–126° C. Two recrystallizations from benzene yields 10.5 g. of product, M.P. 126–128° C., the melting point of which is not changed by further recrystallizations. Calculated weight percent for $C_7H_7N_3$: N, 31.56; C, 63.14; H, 5.30. Found: N, 31.65; C, 63.24; H, 5.40.

Example 2

3-methylpyrido (2.1-c)-s-triazole hydrochloride is prepared by dissolving the 3-methylpyrido (2.1-c)-s-triazole in benzene and adding a solution of hydrochloric acid in ethanol. The salt melts at 280° C. with decomposition after recrystallization from a mixture of water and isopropyl alcohol. Calculated weight percent for $C_7H_7N_3 \cdot HCl$: C, 49.57; H, 4.75. Found: C, 49.53; H, 4.89.

Example 3

3-hydroxypyrido (2.1-c)-s-triazole is prepared as follows:

A mixture of 10 g. of 2-hydrazinopyridine and 10 g. of urea is heated from 140° C. to 200° C. during one hour. The mixture is cooled and triturated with ethanol whereupon the product crystallizes. Two recrystallizations from aqueous ethanol yield 9.8 g. of product, M.P. 223–225° C. A small sample similarly recrystallized gives analytically pure material, M.P. 224–226° C. Calculated weight percent for $C_6H_5N_3O$: C, 53.33; H, 3.73. Found: C, 53.47; H, 3.94.

Example 4

The preparation of 3-benzylpyrido (2.1-c)-s-triazole is as follows:

Equimolar quantities of 2-hydrazinopyridine and phenylacetic acid are heated from 140° C. to 190° C. during one hour. The reaction mixture is cooled and dissolved in 5% hydrochloric acid. The product is precipitated by addition of alkali and recrystallized from isopropyl alcohol to give the pure product in 82% yield, M.P. 158.5–159.5° C. Calculated weight percent for $C_{13}H_{11}N_3$: C, 74.62; H, 5.30. Found: C, 74.35; H, 5.21.

The hydrochloride of 3-benzylpyrido (2.1-c)-s-triazole (prepared by the method of Example 2) has a M. P. of 226–228° C.

Calculated weight percent for $C_{13}H_{11}N_3 \cdot HCl$: C, 63.54; H, 4.92. Found: C, 63.44; H, 4.88.

Example 5

3-isobutylpyrido (2.1-c)-s-triazole is prepared in 46% yield using the method of Example 4 from 2-hydrazinopyridine and isovaleric acid. It has a melting point of 103.5–106° C. Calculated weight percent for $C_{10}H_{13}N_3$: C, 68.54; H, 7.48. Found: C, 68.85; H, 7.66.

Example 6

3-styrylpyrido (2.1-c)-s-triazole is prepared in 55% yield using the method of Example 4 from 2-hydrazinopyridine and cinnamic acid. It has a M. P. of 184–185° C. Calculated weight percent for $C_{14}H_{11}N_3$: C, 75.99; H, 5.01; N, 18.99. Found: C, 75.72; H, 5.20; N, 19.16. This compound also is prepared in poor yield by the reaction of 3-methylpyrido (2.1-c)-s-triazole with benzaldehyde in refluxing acetic anhydride.

Example 7

3-phenylpyrido (2.1-c)-s-triazole is prepared in 43% yield using the method of Example 4 from 2-hydrazinopyridine and benzoic acid. It has a M. P. of 168–169° C. Calculated weight percent for $C_{12}H_9N_3$: C, 73.83; H, 4.65. Found: C, 74.10; H, 4.71.

Example 8

3-(3,4,5-trimethoxyphenyl) pyrido (2.1-c)-s-triazole is prepared in 18% yield using the method of Example 4 from 2-hydrazinopyridine and 3,4,5-trimethoxybenzoic acid. It has a M. P. of 163–165° C. Calculated weight percent of $C_{15}H_{15}N_3O_3$: C, 63.15; H, 5.30. Found: C, 63.20; H, 5.25.

Example 9

3-(benzamidomethyl) pyrido (2.1-c)-s-triazole is prepared in 56% yield using the method of Example 4 from 2-hydrazinopyridine and hippuric acid. It has a M. P. of 184–186° C. Calculated weight percent for $C_{14}H_{12}N_4O$: C, 66.65; H, 4.79. Found: C, 66.93; H, 4.95.

Example 10

3-(2-benzamidoethyl) pyrido (2.1-c)-s-triazole is prepared in 74% yield using the method of Example 4 from 2-hydrazinopyridine and N-benzoyl-β-alanine. It has a M. P. of 180–181.5° C. Calculated weight percent for $C_{15}H_{14}N_4O$: C, 67.65; H, 5.30. Found: C, 67.61; H, 5.18.

Example 11

The preparation of 3-(aminomethyl)pyrido (2.1-c)-s-triazole dihydrochloride is as follows:

3-benzamidomethylpyrido (2.1-c)-s-triazole (8.0 g., .032 mole) is dissolved in 25 cc. concentrated hydrochloric acid and heated five hours on a steam bath. The mixture is cooled and the precipitated benzoic acid filtered off. The filtrate is diluted with ethanol to precipitate the product which is recrystallized from an ethanol and 5% hydrochloric acid mixture to give 3.0 g. (43%) of pure product, M. P. 276° C. (decomposition). Calculated weight percent for $C_7H_8N_4 \cdot 2HCl$: C, 38.02; H, 4.56; Cl⁻, 32.07. Found: C, 38.34; H, 4.72; Cl⁻, 32.23.

Example 12

3-(2-aminoethyl) pyrido (2.1-c)-s-triazole dihydrochloride is prepared in 41% yield using the method of Example 11 from 3-(2-benzamidoethyl) pyrido (2.1-c)-s-triazole. It has a M.P. of 255–256° C. Calculated weight percent for $C_8H_{10}N_4 \cdot 2HCl$: C, 40.87; H, 5.14; Cl⁻, 30.16. Found: C, 41.14; H, 5.36; Cl⁻, 29.99.

Example 13

3-(p-tolyl) pyrido (2.1-c)-s-triazole is prepared using the method of Example 4 from 2-hydrazinopyridine and p-toluic acid.

Example 14

3-cyclohexylpyrido (2.1-c)-s-triazole is prepared using the method of Example 4 from 2-hydrazinopyridine and cyclohexanecarboxylic acid.

Example 15

3-cyclopentylpyrido (2.1-c)-s-triazole is prepared using the method of Example 4 from 2-hydrazinopyridine and cyclopentanecarboxylic acid.

Example 16

3-(2-furyl) pyrido (2.1-c)-s-triazole is prepared using the method of Example 4 from 2-hydrazinopyridine and 2-furoic acid.

Example 17

3-(3-pyridyl) pyrido (2.1-c)-s-triazole is prepared using the method of Example 4 from 2-hydrazinopyridine and nicotinic acid.

The present invention can be embodied in other specific forms without departing from the spirit or essential attributes thereof and, accordingly, reference should be made to the appended claims, rather than to the foregoing specification as indicating the scope of the invention.

I claim:

1. A 3-substituted pyrido (2.1-c)-s-triazole having the formula:

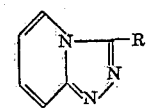

wherein R is an organic radical having from 1 to 9 carbon atoms and selected from the group consisting of alkyl, cyclopentyl, cyclohexyl, phenyl, lower-alkyl substituted phenyl, lower-alkoxy substituted phenyl, furyl, pyridyl, and thiazolyl radicals.

2. A 3-alkylpyrido (2.1-c)-s-triazole wherein the alkyl group has from 1 to 9 carbon atoms.
3. 3-methylpyrido (2.1-c)-s-triazole.
4. 3-benzylpyrido (2.1-c)-s-triazole.
5. 3-isobutylpyrido (2.1-c)-s-triazole.
6. 3-styrylpyrido (2.1-c)-s-triazole.
7. A 3-arylpyrido (2.1-c)-s-triazole wherein the aryl group has from 6 to 9 carbon atoms with 6 carbons comprising the nucleus.
8. 3-phenylpyrido (2.1-c)-s-triazole.
9. The process for forming a 3-substituted pyrido (2.1-c)-s-triazole which comprises heating at between about 140–200° C. a reaction mixture containing a 2-hydrazinopyridine and a carboxylic acid having the formula:

$$R-COOH$$

wherein R is an organic radical having from one to nine carbon atoms selected from the group consisting of alkyl, cyclopentyl, cyclohexyl, phenyl, lower-alkyl substituted phenyl, lower-alkoxy substituted phenyl, furyl, pyridyl, and thiazolyl radicals, to yield a 3-substituted pyrido (2.1-c)-s-triazole having the formula:

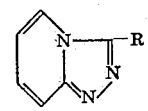

wherein R has the meaning assigned to it above.

10. The process in accordance with claim 9 in which the carboxylic acid is acetic acid.
11. The process in accordance with claim 9 in which the carboxylic acid is phenylacetic acid.
12. The process in accordance with claim 9 in which the carboxylic acid is isovaleric acid.
13. The process in accordance with claim 9 in which the carboxylic acid is cinnamic acid.
14. The process in accordance with claim 9 in which the carboxylic acid is benzoic acid.

References Cited in the file of this patent

Chem. Abst., vol. 45, Subject Index, p. 12300 (1951).